United States Patent
Chu et al.

(10) Patent No.: US 12,068,963 B1
(45) Date of Patent: Aug. 20, 2024

(54) METHOD AND APPARATUS FOR SOURCE FLOW SLICING FOR IMPROVING THE LOAD BALANCING

(71) Applicant: HUAWEI TECHNOLOGIES CO., LTD., Shenzhen (CN)

(72) Inventors: Xingjun Chu, Kanata (CA); Amir Baniamerian, Kanata (CA); Ashkan Sobhani, Kanata (CA); Shichao Guan, Kanata (CA); Shiva Ketabi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/106,788

(22) Filed: Feb. 7, 2023

(51) Int. Cl.
| | |
|---|---|
| G06F 15/16 | (2006.01) |
| H04L 45/00 | (2022.01) |
| H04L 45/7453 | (2022.01) |
| H04L 47/125 | (2022.01) |
| H04L 47/28 | (2022.01) |

(52) U.S. Cl.
CPC ............ *H04L 47/125* (2013.01); *H04L 45/38* (2013.01); *H04L 45/7453* (2013.01); *H04L 47/28* (2013.01)

(58) Field of Classification Search
CPC ........ H04L 47/125; H04L 47/28; H04L 45/38
USPC .................................. 709/202–203, 225–226
See application file for complete search history.

(56) References Cited

U.S. PATENT DOCUMENTS

| | | | | |
|---|---|---|---|---|
| 8,879,397 | B2* | 11/2014 | Xi ......................... | H04L 47/125 |
| | | | | 370/237 |
| 11,876,705 | B2* | 1/2024 | Baniamerian ......... | H04L 47/125 |
| 2013/0286830 | A1* | 10/2013 | Xu ..................... | H04B 7/18584 |
| | | | | 370/232 |
| 2018/0294993 | A1* | 10/2018 | Poulin .................... | H04L 45/66 |
| 2020/0153739 | A1* | 5/2020 | Gafni .................... | H04L 47/125 |
| 2023/0198895 | A1 | 6/2023 | Baniamerian et al. | |
| 2024/0015563 | A1* | 1/2024 | Dutta .................... | H04L 47/125 |

OTHER PUBLICATIONS

M. Alizadeh et. al., "CONGA: Distributed congestion-aware load balancing for datacenters", SIGCOMM, pp. 503-514.
E. Vanini et. al., "Let it flow: Resilient asymmetric load balancing with flowlet switching", NSDI, pp. 407-420, 2017.
M.A. Qureshi et. al., "PLB: congestion signals are simple and effective for network load balancing", SIGCOMM, pp. 207-218, 2022.

(Continued)

*Primary Examiner* — Bharat Barot

(57) ABSTRACT

A method of load balancing in a communications network includes transmitting, by a source node, to a destination node, a first plurality of packets of a "flowlet" of a flow of packets. Each of the first flowlet of packets includes a plurality of header fields and a randomizer. The header fields and the randomizer are used by a networking device located between the source node and the destination node to select an output port of the networking device for the packets of the first flowlet. Further methods include selecting, by the source node, based on a criteria, a second randomizer for inclusion in a plurality of packets of a second flowlet of packets, waiting a time delay after transmitting the first flowlet of packets, then, inserting the second randomizer into the sequential second flowlet of packets, and transmitting the second flowlet of packets.

20 Claims, 7 Drawing Sheets

(56) References Cited

OTHER PUBLICATIONS

X. Diao et. al., "Flex: A flowlet-level load balancing based on load-adaptive timeout in DCN", Future Generation Computer Systems, vol. 130, pp. 219-230, 2022.
A. Ford et al., "RFC 6824: TCP extensions for multipath operation with multiple addresses", Internet Engineering Task Force, 2013.

* cited by examiner

IP Header - 502

| Version | Header Length | Type of Service | Total Length | |
|---|---|---|---|---|
| Identification | | | IP Flags | Fragment Offset |
| Time to Live | | Protocol - 518 | Header Checksum | |
| Source Address - 504 | | | | |
| Destination Address - 506 | | | | |
| IP Options - 508 | | | | |

TCP Header – 510

| Source port - 512 | | | Destination Port - 514 |
|---|---|---|---|
| Sequence number | | | |
| Acknowledgement number | | | |
| DO | RSV | Flags | Window |
| Checksum | | | Urgent pointer |
| Options - 520 | | | |

FIG. 5

METHOD AND APPARATUS FOR SOURCE FLOW SLICING FOR IMPROVING THE LOAD BALANCING

CROSS-REFERENCE TO RELATED APPLICATIONS

This is the first application filed for this invention.

FIELD OF THE INVENTION

This disclosure pertains generally to the field of congestion control in communication networks and in particular, to methods and apparatus for implementing load balancing within network hardware device.

BACKGROUND OF THE INVENTION

In order to avoid congestion in data center networks (DCNs), various load balancing (LB) algorithms have been developed. These algorithms can be categorized from various angles. From the network information point of view, LB algorithms may be categorized into two main subgroups; adaptive (network state aware), and oblivious (network state invariant). LB algorithms may also be categorized as source-based, in-network and hybrid. Source-based algorithms are typically implemented at sending nodes in their protocol stacks. In-network algorithms are typically implemented in network switching hardware. Hybrid LB algorithms are a combination of the former approaches.

In high performance DCNs, an adaptive LB algorithm can play a central role to reduce latency and increase the throughput of the network. However, in-network LB algorithms may require significant changes in hardware and software that may not be feasible (technically or economically) for existing networks. Adaptive approaches may introduce more overhead and available results may not be applicable to commodity off the shelf software defined networking (SDN) switches. On the other hand, source-based approaches may require the very few or no hardware modifications.

The goal of LB algorithms is to distribute traffic through the network for decreasing latency as well as increased throughput. In other words, in stationary situations this may involve the distribution of traffic among all possible paths and links.

Currently available LB algorithms suffer from two main drawbacks; they require hardware modifications (to be fully compatible with switch pipelines), and they cannot be adapted to some hop-by-hop routing mechanisms.

Therefore, there is a need for LB that obviates or mitigates one or more limitations in the prior art by not requiring, or requiring only minimal hardware modifications, being compatible with well-established and hop-by-hop algorithms, such as the "Equal-Cost Multi-Path (ECMP)" algorithm, and by being source-based that have, at most, minimal requirements for network switches.

This background information is intended to provide information that may be of possible relevance to the present invention. No admission is necessarily intended, nor should be construed, that any of the preceding information constitutes prior art against the present invention.

SUMMARY OF THE INVENTION

Embodiments of the present disclosure generally provide for methods and apparatus for implementing load balancing in network devices by introducing a randomizer element to packet headers that allow network devices (switches) to balance the load on their output ports. The randomizer may be added to each packet header and be processed by switches as a "6-tuple," similarly to how 5-tuples are presently processed. The randomizer may be periodically varied based on application specific criteria.

In embodiments, a packet flow between a source node and destination node may be divided into "flowlets", sequential groups of packets, with different randomizer values common for all packets in a particular flowlet. A source load may insert a time delay between flowlets to reduce the chance of packets arriving at the destination node in an out of order sequence.

Embodiments may be implemented in software stacks at source nodes. In some cases, minor software or configuration changes may be required at switching hardware to support methods as disclosed herein.

According to an embodiment of the present disclosure, there is provided a method of load balancing (LB) in a communications network. The method includes transmitting, by a source node, to a destination node, a plurality of packets of a flow, where each of the plurality of packets including a plurality of header fields and a randomizer. The flow includes at least one flowlet including a sequential subset of the plurality of packets of the flow. The header fields of each of the packets of the flowlet include the same randomizer value. The header fields and the randomizer are used by a networking device located between the source node and the destination node to select an output port of the networking device for the packets of the flowlet.

In further embodiments, the networking device computes a hash based on the header fields and the randomizer used to select the output port.

In further embodiments, the flowlet is one of a plurality of flowlets of the flow and the plurality of flowlets are created by the source node by dividing the plurality of packets of the flow into subsets of sequential packets. The method further includes selecting, by the source node, based on a criteria, a second randomizer then waiting a time delay between transmitting a last packet of the flowlet. Also, inserting the second randomizer into the sequential packets of a second one of the flowlets, and transmitting the second one of the flowlets.

In further embodiments, the criteria is an amount of packets transmitted by the source node.

In further embodiments, the criteria is an amount of congestion of the networking device.

In further embodiments, the amount of congestion is measure using explicit congestion notification (ECN) protocols or round trip time (RTT) measurements.

In further embodiments, the criteria is an amount of time since a packet of the flowlet has been transmitted.

In further embodiments, the randomizer is selected using a round robin algorithm.

In further embodiments, the randomizer is a random number.

In further embodiments, the header fields include a 6-tuple including a source address, a source port, a destination address, a destination port, a protocol, and a randomizer.

According to an embodiment of the present disclosure, there is provided a network device, such as a switch, a router, or other networking hardware and software incorporating switching functions. The network device includes a processor and a non-transitory memory for storing instructions that when executed by the processor cause the networking device to be configured to be operable to perform any of the methods as described herein. In particular, embodiments of the present disclosure may provide a network device including a processor and a non-transitory memory for storing instructions that when executed by the processor cause the network device to be configured to be operable to transmit, to a destination node, a plurality of packets of a flow, where each of the plurality of packets includes a plurality of header fields and a randomizer. The flow includes at least one flowlet including a sequential subset of the plurality of packets of the flow. The header fields of each of the packets of the flowlet include the same randomizer value. Also, the header fields and the randomizer are used by other networking devices located between a source node and the destination node to select an output port of one of the networking devices for the packets of the flowlet.

In further embodiments the flowlet is one of a plurality of flowlets of the flow, and the plurality of flowlets are created by the source node dividing the plurality of packets of the flow into subsets of sequential packets. The memory stores further instructions that when executed by the processor further causing the network device to be configured to be operable to select, based on a criteria, a second randomizer, wait a time delay between transmitting a last packet of the flowlet, and inserting the second randomizer into the sequential packets of a second one of the flowlets. Also, transmitting the second one of the flowlets.

The network device may be a source node, or any node between the source node and a destination node. The network device may create flowlets, modify flowlets, and pass on or modify flowlets. Different criteria related to flowlets and time delays between flowlets may also be used along the path of a flow between a source node and a destination node which may be based on static or dynamic network conditions.

According to an embodiment of the present disclosure, there is provided a computer readable medium for storing instructions that when executed by the processor of a networking device, cause the networking device to be configured to be operable to perform any of the methods as described herein.

Embodiments have been described above in conjunctions with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 5 illustrates IP and TCP headers that may be used in embodiments of the present disclosure.

It will be noted that throughout the appended drawings, like features are identified by like reference numerals.

DETAILED DESCRIPTION OF THE INVENTION

Embodiments of the present disclosure generally provide for methods and apparatus for implementing load balancing (LB) in network devices by using an adaptive and source-based approach. Network source nodes may only require modified software, such as network stacks. Switching network hardware requires no hardware modifications and only minimal software or configuration changes, thereby allowing embodiments to utilize commodity switches. Embodiments may be particularly beneficial in cases where hop-by-hop is used. The LB algorithms described herein distribute traffic through the network to achieve decreased latency as well as increased throughput. Embodiments help to randomizing the traffic distribution in switches which can significantly help to balance traffic without any knowledge of the network status. In summary, the LB algorithms described herein may not require any hardware modifications, may be fully compatible with well-established and hop-by-hop "Equal-Cost Multi-Path (ECMP)" algorithms, and are source-based such that no modifications or only minor software or configuration modifications are required on switches and other networking devices with switching functionality.

Embodiments incorporate one or more features such as being proactive, source-based, in-network stateless, do not require control plane involvement, and have low overhead at the host. Traffic is proactively distributed among available output ports while incurring minimal packet reordering. Traffic balanced by modifications at the hosts requiring no hardware modification or minimal traffic modification. Switches do not need to track flow states and consequently do not require any significant additional network resources. The actions at switches (e.g., ECMP Hashing) may be performed in the data plane (DP) pipeline without control plane (CP) involvement, thereby minimizing any additional delays. Although embodiment involve multiple paths at the transport layer, overhead at the host is minimized by not requiring the tracking of congestion windows of all paths.

Figure 1:
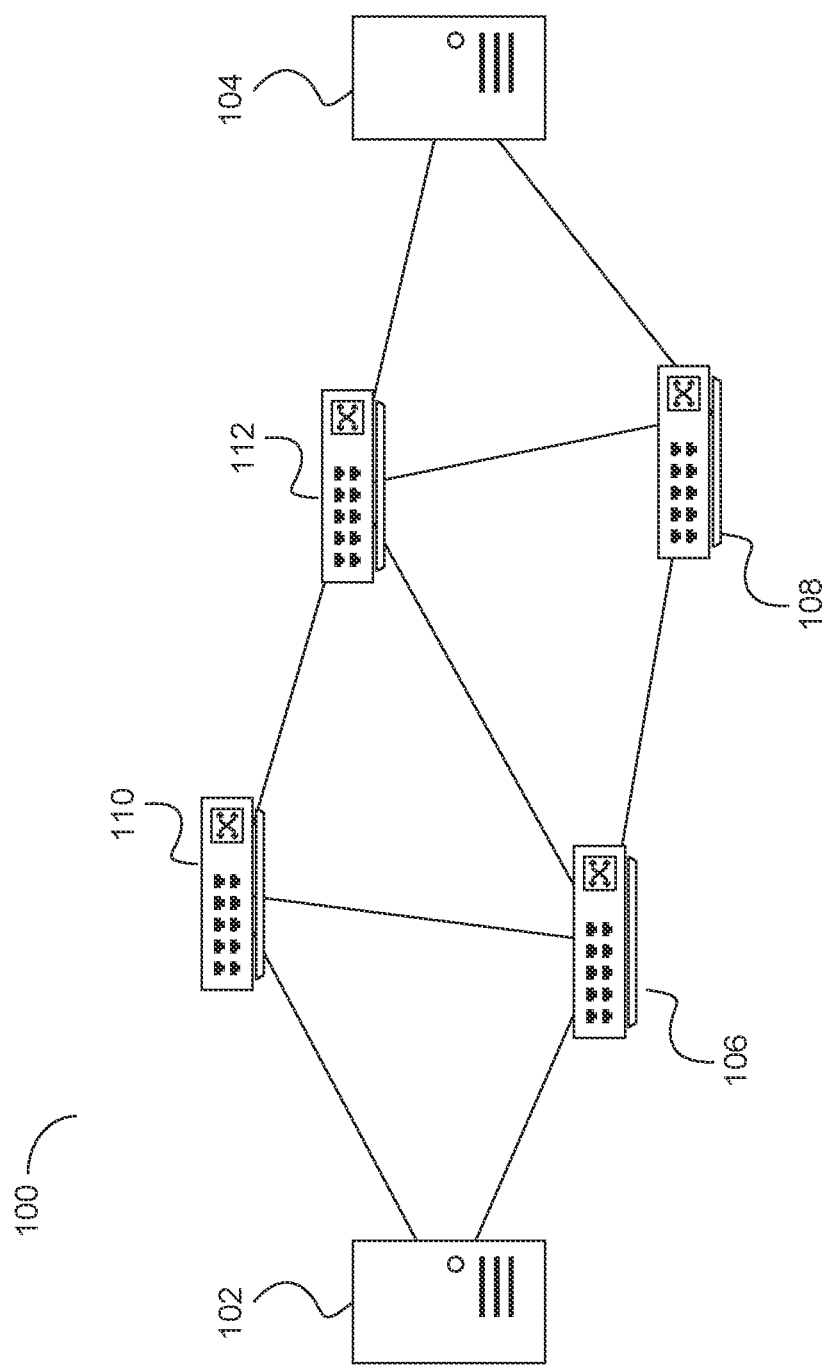
FIG. 1 illustrates a generic communications network that may make use of embodiments of the present disclosure.

FIG. 1 illustrates a generic communications network 100 that may make use of embodiments of the present disclosure. A source node 102 generates or transmits packets towards a destination node 104. Both the source node 102 and the destination node 104 may be any one of a variety of networked communications or computing devices such as mobile devices, Internet-of-Things (IoT) devices, tablets, computers, servers, etc. as are known in that area. Various network paths exist between the source node 102 and the destination node 104 including one or more networking devices 106, 108, 110, 112, that include switching hardware or switching functions, such as hardware switches or routers. The source node 102, the destination node 104, and the networking devices include operating systems including networking stacks that implement networking protocols such as TCP/IP or UDP/IP. Networking protocols may be described using the 7-layer ISO/OSI reference model where TCP and UDP are both classified as layer 4 protocols (Transport layer) and IP is classified as a layer 3 protocol (Network layer). Transport layer protocols are used for end-to-end connections, for example between the source node 102 and the destination node 104. Network layer protocols may be at the packet level and are used in each hop between the source node 102 and the destination node 104, for example between source node 102 and networking device 106.

Figure 2:
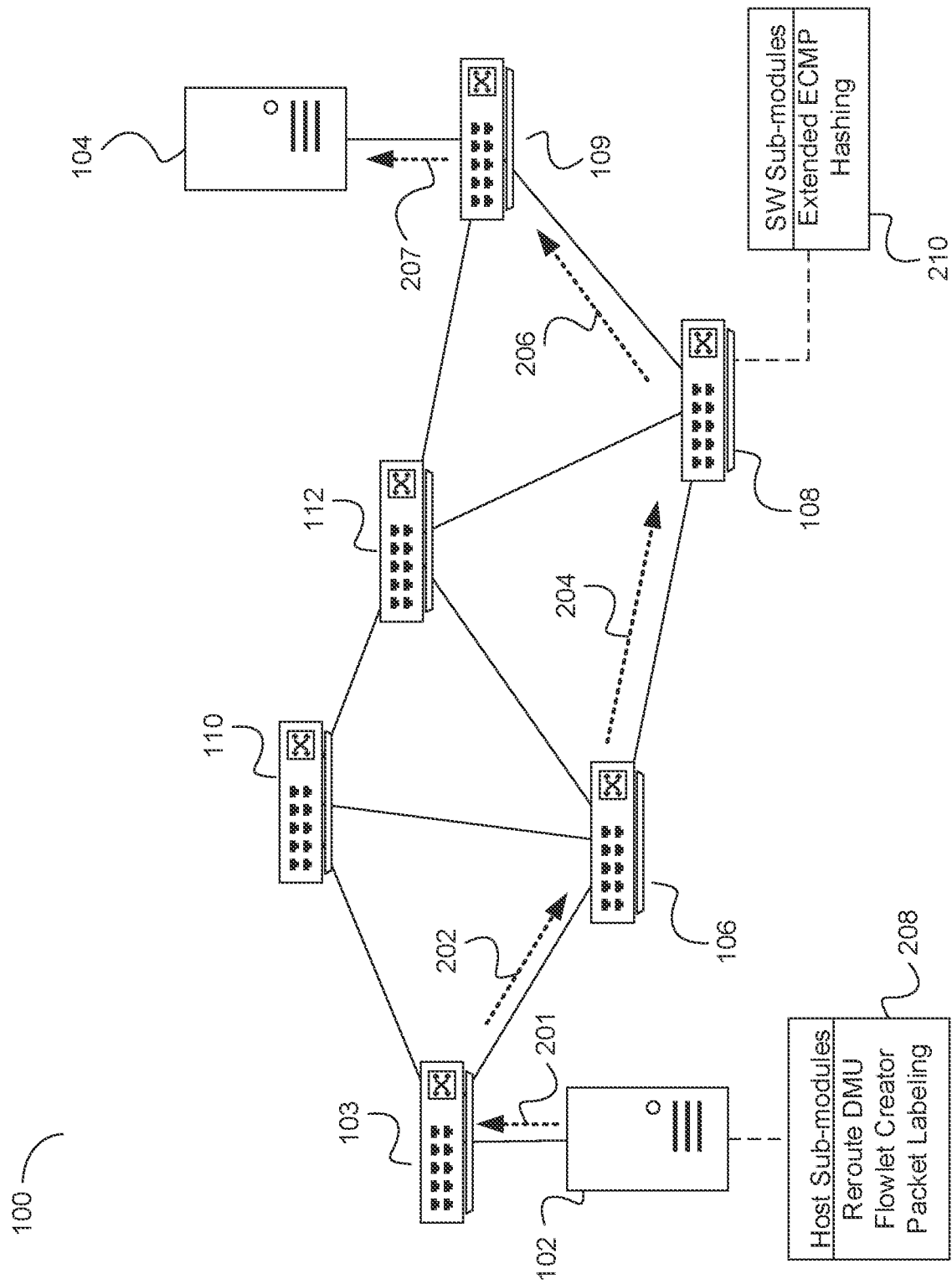
FIG. 2 illustrates a communications network illustrating functions of source nodes and switching nodes, according to an embodiment of the present disclosure.

FIG. 2 illustrates the communications network 100 illustrating components of the source node 102 and the switching nodes (for example networking device 106), according to an embodiment of the present disclosure. Embodiments may be implemented in DCN LB with modifications to current hardware. At the source node 102 host sub-modules 208 include a reroute Decision Making Unit (DMU) sub-module, a "Flowlet" Creator sub-module, and a Flow Labeling sub-module may be added to software or firmware of the source node 102. At networking devices, such as a switch 108, switch (SW) sub-modules 210 include an Extended ECMP Hashing sub-module may be added to the software or firmware of the networking device.

As depicted in FIG. 2, the host sub-modules 208 includes three sub-modules that may be used when routing packets of a flow from a source node 102 to a destination node 104 along a path. As illustrated, the source node 102 is connected to a first networking device 103 over path 201. In embodiments, networking device 103 may be a switch referred to as a "Top of Rack" (ToR) switch. From networking device 103, the end-to-end path proceeds along several hops. A first hop between networking device 103 and networking device 106 over path 202, a second hop between networking device 106 and networking device 108 over path 204, a third hop between networking device 108 and networking device 109 over path 206, and a final hop from networking device 109 to destination node 104 over path 207. In embodiments, networking device 109 may also be a ToR switch. Networking devices 106, 108, 110, and 112 may also be switches. For each connection (e.g., TCP or RPC connections), these sub-modules are executed. Hence, in each sub-module, "the flow" refer to the corresponding flow of packets between a source node 102 and a destination node 104. For example, if there have two flows, the transport layer may execute these sub-modules for each flow, independently. The rerouting DMU includes the responsibility of determining whether the flow needs to be rerouted or not. Rerouting may be done using various criteria such as a number of packets routed or a level of congestion detected. When rerouting is done based on the number of packets, methods described herein divide a flow into small batches based on a threshold (e.g., a maximum number of packets in each batch). Whenever the number of packets, for example, as measured by a counter, exceeds a threshold, the packet flow should be rerouted, after which, the counter may be reset. This proactive and periodic rerouting may help to avoid congestion before it occurs. When the rerouting is done based on network device congestion, if the transport layer identifies congestion the flow may be rerouted (even if the number of packets is not beyond the threshold). Congestion may be detected using various protocols as known in the art such as Explicit Congestion Notification (ECN) or by measuring Round-trip Time (RTT).

Figure 3:
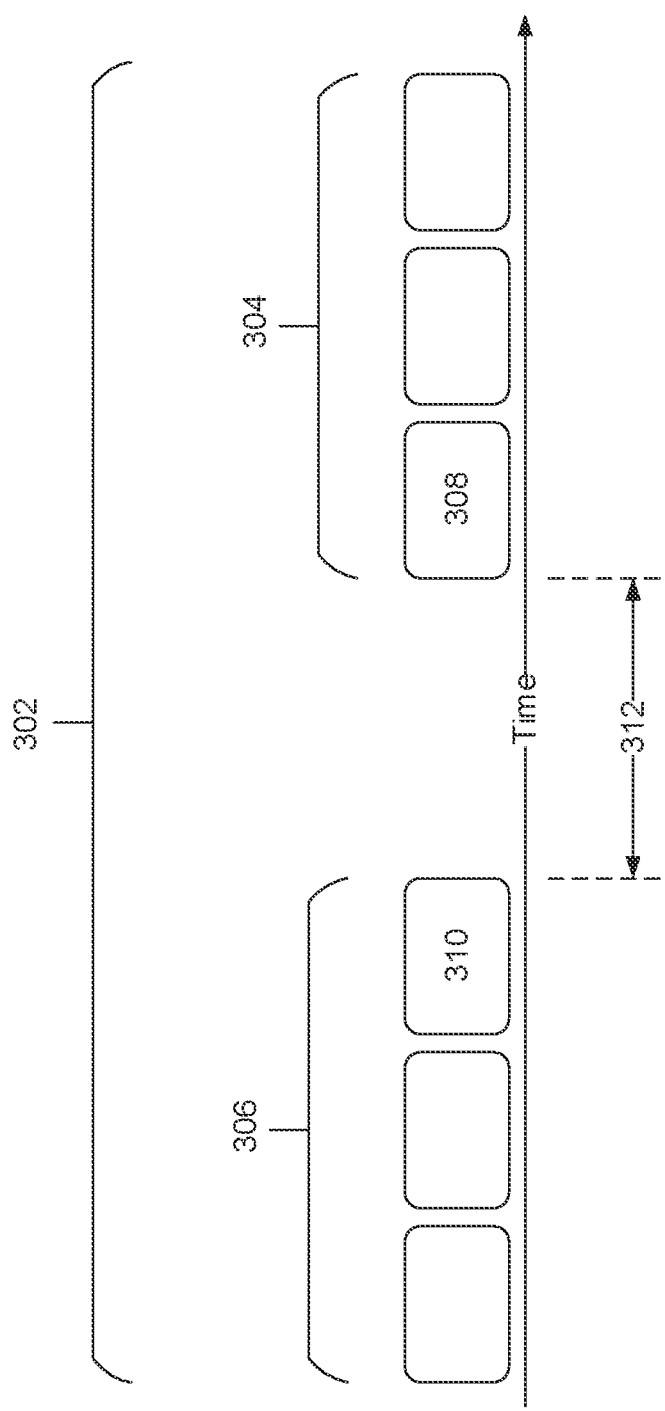
FIG. 3 illustrates the division of a packet flow into flowlets, according to an embodiment of the present disclosure.

FIG. 3 illustrates the division of a packet flow into flowlets, according to an embodiment of the present disclosure. A packet flow, which may be referred to herein as a flow, may be used to describe a sequence of packets send from a source node 102 to a destination node 104 as part of a communication. The communication may be divided into packets based on the protocols, such as the IP protocol. In embodiments, rerouting the flow from one path to another one may result in packet disorder or packets arriving at a networking device or at the destination node 104 out of order, that is to say, in a different order than the order they were transmitted in. Packet disorder may cause significant delays and result in the resending or retransmission of data and hence may cause considerable impact to network throughput and performance of the network. One method of mitigating packet disorder includes rerouting a flow when the gap, such as gap 312, between two consecutive packets, such as a packet 308 and a packet 310 is sufficiently large. This gap 312 may be used to distinguish between two series of packets 304 and 306, where each one is referred to as a "flowlet". In FIG. 3, a flow 302 of packets is divided into two flowlets, 304 and 306, which may include the same number of packets or may have different number of packets. Between packet 308 of flowlet 304 and packet 310 of flowlet 306 is a gap 312. The length of the gap 312 may be referred to as being $Flowlet_{timeout}$ in time. In embodiments, the Flowlet Creator sub-module of a source node 102 may intentionally create flowlets from the flow 302, such as flowlet 304 and flowlet 306, with a gap 312 of $Flowlet_{timeout}$ long.

In embodiments, the value of $Flowlet_{timeout}$ may be estimated in order to reduce the probability of encountering packet disorder at the destination node 104. When the Reroute DMU sub-module leads to a rerouting of the flow 302, the Flow Slicing sub-module may insert a delay equal to a current estimated $Flowlet_{timeout}$ and then reroute the flow, thereby creating a new flowlet. An estimated $Flowlet_{timeout}$ may be determined using a number of methods such as basing $Flowlet_{timeout}$ on a measured RTT and using the formula, $Flowlet_{timeout} = RTT_{max} - RTT_{min}$.

Figure 4:
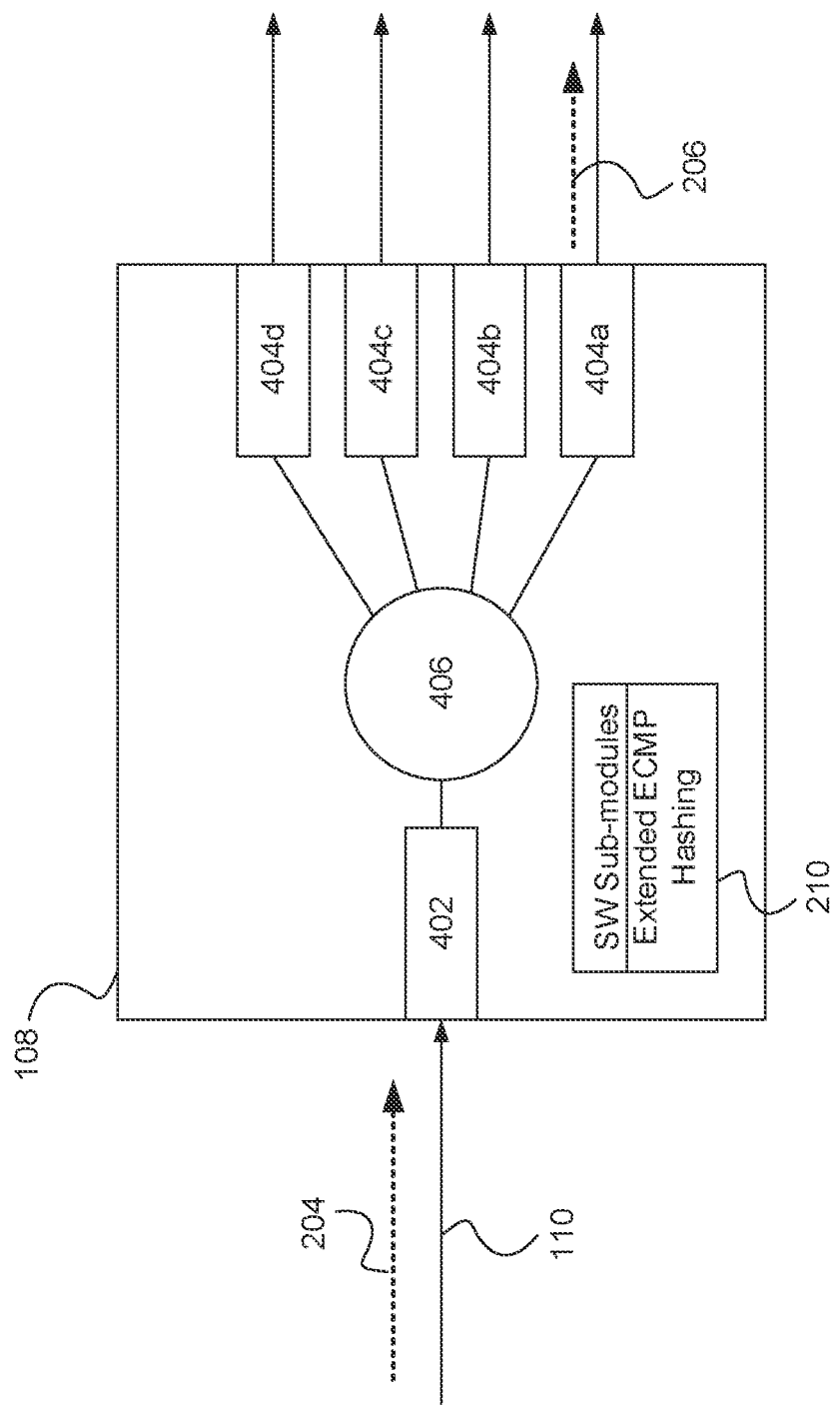
FIG. 4 illustrate a switching node and its parts, according to an embodiment of the present disclosure.

With reference to FIG. 4, the Flow Labeling sub-module may be used to reroute packets of the flow within a networking device such as switch 108. Switch 108 may receive packets transmitted over a path 204 on a link 110 and receive them on input port 402. Switch 108 may use a mix of software (including SW sub-module, Extended ECMP Hashing), firmware, and hardware to examine the received packet using processing resources 406, to decide which output port 404a through 404d to transmit the packet on, for example on path 206.

FIG. 5 illustrates IP and TCP headers that may be used in embodiments of the present disclosure. Packets of a flow, and of a flowlet include headers specifying source and destination information at the hop level (e.g., a single link) and at the level of end-to-end communications between a source node 102 and a destination node 104. IP header 502 includes information such as a source address 504, a destination address 506, a protocol 518, and IP options 508. TCP header 510 includes information such as a source port 512, a destination port 514, and options 520. In the art, the set of 5-tuple refers to the set of the source IP address 504, the source port 512, the destination IP address 506, the destination port 514, and the transport protocol 518 and uniquely identifies a TCP session. Similar information may also be used to uniquely identify a UDP session. Many networking devices may utilize a 5-tuple for processing packets and may also support the use of an additional field added to a 5-tuple to create a 6-tuple. In embodiments, IP Options 508 field or the Options field 520 may for the additional field of a 6-tuple. The support of a 6-tuple may be a build in feature of a networking device, may be a configurable option, or may require additional software. Many networking devices that support the use of an ECMP hash function to determine an output port for a packet also accept a 6-tuple to identify the next hop of a packet and therefore, the correct output port to use.

All packets 308 of a flowlet 304 of a flow 302, include an identical 5-tuple. Therefore, the additional field of a 6-tuple may be used by an ECMP Hashing sub-module to reroute flowlets along each hop of a path. In embodiments, the additional field of a 6-tuple may be a randomizer, common to all packets of a flowlet, that causes the ECMP Hashing sub-module in a networking device to route packets to an output port based on the randomizer value (given that the 5-tuple is the same for a flow 302). In other words, given that all packets of a flow include the same 5-tuple, the additional randomizer value may be used to select the output port of a packet. Also, as all packets of a flowlet may use the same randomizer value (e.g., have the same 6-tuple), all packets of a flowlet will take the same path. Then, by changing the randomizer value, the networking device's selected output port, and therefore the flowlet's packets' path also changes. The randomizer may be a random number generated by the Host sub-module 208 Packet Labeling sub-module which may cause the packets of each flowlet take a random path between source node 102 and destination node 104, with all packets of any flowlet following the same path. The randomizer may be selected based on a Round-Robin algorithm so that the output port of each flowlet is selected in sequence.

In other words, the effects of adding a randomizer element to packet headers include that it allows a network device (switch) to balance the load on their output ports. The randomizer may be added to each packet header and be processed by switches as a "6-tuple," similarly to how 5-tuples are presently processed. The randomizer may be periodically varied based on application specific criteria, such as the number of packets processed or based on congestion in a networking device. In embodiments, a packet flow 302 between a source node 102 and destination node 104 may be divided into "flowlets," sequential groups of packets, with different randomizer values common for all packets in a particular flowlet. A source load may insert a time delay, $Flowlet_{timeout}$, between flowlets to reduce the chance of packets arriving at the destination node in an out of order sequence. Time delays between a plurality of flowlets may be the same or different between any two consecutive flowlets.

Figure 6:
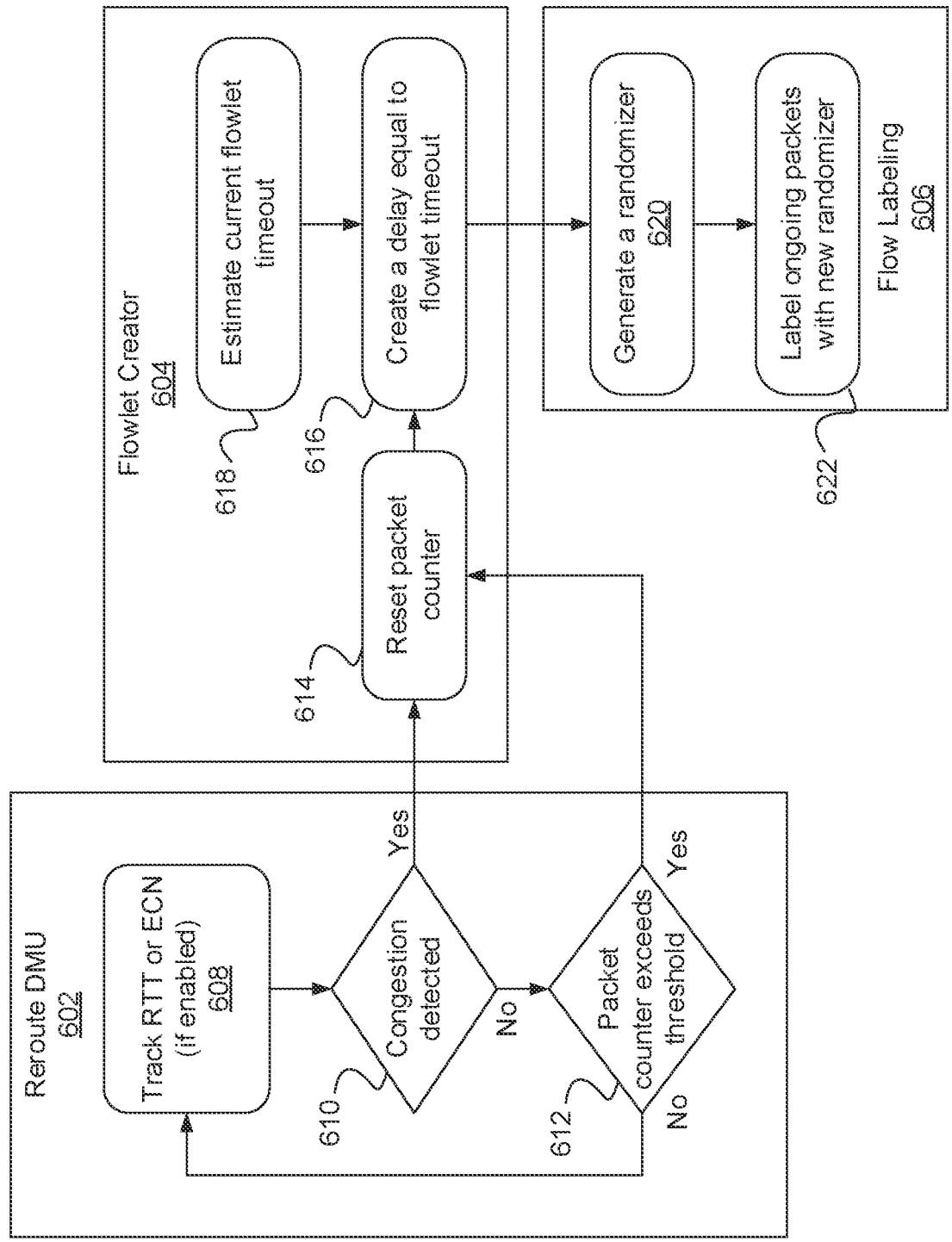
FIG. 6 illustrates a load balancing (LB) method, according to an embodiment of the present disclosure.

FIG. 6 illustrates a LB method, according to an embodiment of the present disclosure, that includes the functions performed by each of the Host sub-modules 208. In Reroute DMU sub-module 602, network parameters such as RTT or ECN may be tracked in step 608. If congestion is not detected in step 610, then a packet counter may be used to determine the number of packets received or transmitted to determine if a threshold is exceeded. If congestion is detected in step 610 or if the packet threshold is exceeded in step 612, processing may pass to the Flowlet Creator 604 sub-module in step 614. Step 614 include, first resetting the packet counter. Then, in step 616, a $Flowlet_{timeout}$ delay supplied by step 618 may be used to insert a gap into the flow to create a new flowlet. In the Flow Labeling 606 sub-module, the randomizer value is generated in step 620, which is then included in all ongoing packets of the same flowlet.

Figure 7:
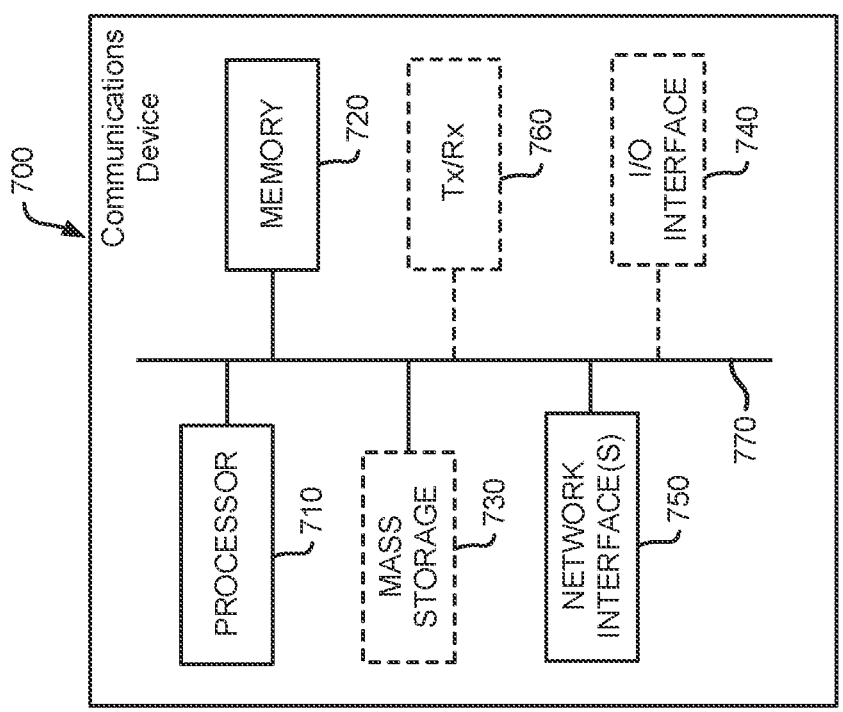
FIG. 7 provides a schematic diagram of communication devices that be used to implement embodiments of the present disclosure as described herein.

FIG. 7 is a schematic diagram of a communications or networking device 700, one of more of which may be used to implement embodiments of the present disclosure as described herein. Source nodes and destination nodes, which may be physical or virtual servers, personal computers, mobile devices, consumer electronics, etc., may be or may include communications devices as described. Furthermore, network hardware, such as switches, routers, and other devices that may switch or route packets may also be or may include communications devices as described. It is also noted that communications devices directing operations of embodiments of the present disclosure may be or include microcontrollers or microprocessors (including ASICs) which execute program instructions stored in-memory, or other digital or analog circuitry, or a combination thereof.

As shown, the device includes a processor 710, such as a Central Processing Unit (CPU) or specialized processors such as a ASIC processors or other such processor unit, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a database node, storage layer node, lock manager, or the like and pursuant to one or more, or a part of one or more, program elements, modules or objects generated from any programming language, such as C++, Java, P4, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of load balancing in a communications network, the method comprising:
    transmitting, by a source node, to a destination node, a plurality of packets of a flow, each packet of the plurality of packets including a plurality of header fields and a randomizer value, the flow including at least two flowlets each including a respective sequential subset of the plurality of packets of the flow, the header fields of each of the packets of a same flowlet of the at least two flowlets including a same randomizer value, the randomizer value of a different flowlet of the at least two flowlets having a different randomizer value;
    wherein the header fields and the randomizer value of each of the at least two flowlets are used by a networking device located between the source node and the destination node to select an output port of the networking device for the packets of each of the at least two flowlets.

2. The method of claim 1 wherein the networking device computes a hash based on the header fields and the randomizer value used to select the output port.

3. The method of claim 1, wherein;
    the at least two flowlets are created by the source node by dividing the plurality of packets of the flow into subsets of sequential packets, a first of the subsets of sequential packets being associated with a first flowlet of the at least two flowlets, a second of the two subsets of sequential packets being associated with a second flowlet of the at least two flowlets,
    selecting, by the source node, based on a criteria, a first randomizer value for the first flowlet and a second randomizer value for the second flowlet;
    waiting a time delay after transmitting a last packet of the first flowlet;
    inserting the second randomizer into the sequential packets of the second flowlet; and
    transmitting the second flowlet.

4. The method of claim 3 wherein the criteria is a number of packets transmitted by the source node.

5. The method of claim 3 wherein the criteria is an amount of congestion of the networking device.

6. The method of claim 5 wherein the amount of congestion is measured using explicit congestion notification (ECN) protocols or round trip time (RTT) measurements.

7. The method of claim 3 wherein the criteria is an amount of time since a packet of a previous flowlet amongst the at least two flowlets has been transmitted.

8. The method of claim 1 wherein the randomizer value is selected using a round robin algorithm.

9. The method of claim 1 wherein the randomizer value is a random number.

10. The method of claim 1 wherein the header fields comprise a 6-tuple including a source address, a source port, a destination address, a destination port, a protocol, and the randomizer value.

11. A network device comprising:
    a processor; and
    a non-transitory memory for storing instructions that when executed by the processor cause the network device to be configured to be operable to:
    transmit, to a destination node, a plurality of packets of a flow, each packet of the plurality of packets including a plurality of header fields and a randomizer value, the flow including at least two flowlets each including a respective sequential subset of the plurality of packets of the flow, the header fields of each of the packets of a same flowlet including a same randomizer value, the randomizer value of a different flowlet of the at least two flowlets having a different randomizer value;
    wherein the header fields and the randomizer value of each of the at least two flowlets are used by other networking devices located between a source node and the destination node to select an output port of one of the networking devices for the packets of each of the at least two flowlets.

12. The network device of claim 11 wherein the memory stores further instructions that when executed by the processor cause the network device to be configured to be operable to: compute a hash based on the header fields and the randomizer value used to select the output port.

13. The network device of claim 11, wherein the at least two flowlets are created by the source node dividing the plurality of packets of the flow into subsets of sequential packets, a first of the subsets of sequential packets being associated to a first flowlet of the at least two flowlets, the first flowlet having associated thereto a first randomizer value, a second of the two subsets of sequential packets being associated to a second flowlet of the at least two flowlets, and wherein the memory stores further instructions that when executed by the processor further cause the network device to be configured to be operable to:
    select based on a criteria, a second randomizer value;
    wait a time delay after transmitting a last packet of the first flowlet;
    insert the second randomizer value into the sequential packets of the second flowlet; and
    transmit the second flowlet.

14. The network device of claim 13 wherein the criteria is a number of packets transmitted by the source node.

15. The network device of claim 13 wherein the criteria is an amount of congestion of the networking device.

16. The network device of claim 15 wherein the amount of congestion is measure using explicit congestion notification (ECN) protocols or round trip time (RTT) measurements.

17. The network device of claim 13 wherein the criteria is an amount of time since a packet of a previous flowlet amongst the at least two flowlets has been transmitted.

18. The network device of claim 11 wherein the randomizer value is selected using a round robin algorithm.

19. The network device of claim 11 wherein the randomizer value is a random number.

20. The network device of claim 11 wherein the header fields comprise a 6-tuple including a source address, a source port, a destination address, a destination port, a protocol, and the randomizer value.

\* \* \* \* \*